July 11, 1967 W. S. HENDERSON 3,330,452

SIMULATED TORSO

Filed Nov. 18, 1964 6 Sheets-Sheet 1

INVENTOR.
WILLIAM S. HENDERSON

BY Hugh A. Kirk

ATTORNEY

July 11, 1967 W. S. HENDERSON 3,330,452

SIMULATED TORSO

Filed Nov. 18, 1964 6 Sheets-Sheet 2

INVENTOR.
WILLIAM S. HENDERSON

BY Hugh A. Kirk

ATTORNEY

July 11, 1967 W. S. HENDERSON 3,330,452

SIMULATED TORSO

Filed Nov. 18, 1964 6 Sheets-Sheet 3

INVENTOR.
WILLIAM S. HENDERSON

BY

Hugh A. Kirk

ATTORNEY

INVENTOR.
WILLIAM S. HENDERSON
BY Hugh A. Kirk
ATTORNEY

INVENTOR.
WILLIAM S. HENDERSON
BY Hugh A. Kirk
ATTORNEY

July 11, 1967 W. S. HENDERSON 3,330,452

SIMULATED TORSO

Filed Nov. 18, 1964 6 Sheets-Sheet 6

INVENTOR.
WILLIAM S. HENDERSON

BY [signature]

ATTORNEY

United States Patent Office
3,330,452
Patented July 11, 1967

3,330,452
SIMULATED TORSO
William S. Henderson, Monroe, Mich., assignor to Consolidated Packaging Corporation, Monroe, Mich., a corporation of Michigan
Filed Nov. 18, 1964, Ser. No. 412,008
2 Claims. (Cl. 223—68)

This invention relates to a simulated torso. More particularly, it deals with a fiberboard torso form used primarily in the display of shirtwaists and other similar articles of body apparel.

It is an object of this invention to produce a simple, readily assembled, light weight, durable, effective, and economic display form for shirtwaists and other wearing apparel.

It is another object of this invention to provide a collapsible clothing display form which when set up has a shape substantially conforming to that of a human torso and which provides the garment displayed thereon with a vivid and natural appearance to the viewer.

It is still another object of this invention to produce an exhibiting mannikin for garments ranging in length from shirtwaists to robes.

It is another object of the invention to produce a versatile torso form which can be varied to vividly display articles of apparel for men or women.

It is still another object of this invention to provide a shirtwaist display form having a means for concealing the below-the-waist portions of the shirt commonly referred to as the shirt tails.

Another object of this invention is to provide a foldable blank for the body or bust of a garment form with a generally angular guide flap which when unfolded has a guide edge that parallels the juncture line of the subsequently flat folded body blank and thereby facilitates machine gluing and pre-assembly.

Still another object of this invention is to provide a torso form with an attractive and decorative exterior surface.

Another object of this invention is to provide a torso form with means for supporting the same including means for support on a vertical member as well as by a foldable slip-on fiberboard support base.

Another object of this invention is to provide a simulated torso with an attachable natural appearing tapered and elliptical neck member having an enclosed top.

Another object of this invention is to provide a simulated torso with an attachable female breast form of transparent or translucent plastic.

Generally speaking, the torso form is made from semi-rigid sheet material and has spaced apart front and back panels with spaced apart side panels foldably connected thereto. A natural appearing shoulder line is created by arcuately bent and inclined shoulder panel which span the area at the top of said spaced apart panels. The body member of the form is preferably made of a single appropriately scored and slit blank of decoratively coated fiberboard with the various panels being connected at fold lines and provided with a system of especially located slits and corresponding engaging tabs whereby final assembly may be achieved without the use of tools or extraneous materials.

The upright exterior panels of the body member are flat and generally quadralateral in shape with their connecting fold lines and upright edge converging slightly from top to bottom. A substantially triangular junction and guide flap is connected along the upright fold line of a side panel to facilitate the mechanical application of a fastening means, such as gluing, and pre-assembly. The guiding edge of said flap provides a means for the aligned entry of the body blank into a folding and fastening means so that the juncture and guide flap and its adjacent side panel may be manually or automatically folded over the front panel and when so folded said juncture will be aligned with the direction of travel through a folding and fastening machine. The guiding edge may also be perpendicular to the bottom edge of the main body panel.

The torso form is provided with bottom closure flaps which serve to hold in place any shirtwaist displayed thereon by tensionally engaging the below-the-waist portions of said shirtwaist when they are tucked between the closure flaps into the hollow interior of the torso form.

A foldable base member comprising an open top type tray with inwardly tapered sides may be provided as a seat surrounding the smaller lower portion of the erected torso form to stabilize the torso form when resting on a horizontal support.

A neck member also may be employed, the blank for which is preferably designed with a juncture and guide flap that provides a means for the mechanical flat folding of the fiberboard blank so that the hinged edge of the juncture flap parallels the direction of passage of the blank through a folding and fastening machine. A fastening means may be applied along the hinge edge of the juncture flap whereby the cooperating overlapped back panel is secured thereto forming a flat pre-assembled neck member in the same manner as the flat pre-assembled body member may be formed. The neck member when fully assembled has a top closure containing a torso supporting rod engaging slot for containing the top portion of a supporting rod which cooperates with a support engaging means in the bottom of the torso form thereby providing an alternative torso supporting means for use when the foldable base support is not used.

A female breast form member having a naturally distinctive configuration, which may be formed of a thin relatively rigid transparent molded plastic or other suitable material and provided with tuck tabs, may be removably attached to the body member when the simulated torso is used to depict a female torso.

Final assembly of these sub-assemblies or members may be achieved by the systematic folding of the panels and flaps and the insertion of tuck tabs in their corresponding engaging slits.

The above mentioned and other features and objects of this invention and the manner of attaining them will become more apparent and the invention itself will be best understood by reference to the following description of embodiments of the invention taken in conjunction with the accompanying drawings, wherein.

Figure 3:
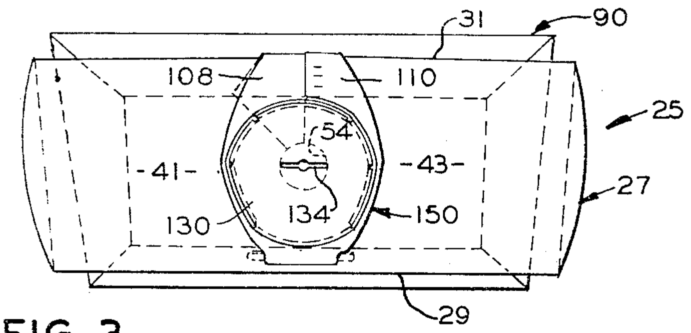
FIG. 3 is a top view of the torso form shown in FIGS. 1 and 2.

Referring to the drawings, FIGS. 1 through 4 illustrate a simulated torso form 25 particularly suitable for a male garment such as a shirt. The form 25 as shown is inclusive of three members or parts, the first of which is a main bust or body portion 27 fabricated from a cut and scored fiberboard blank 28 having spaced apart front 29, back 31 and side 33 and 34 panels each tapered inwardly from top to bottom; the front and back panels 29 and 31 are tapered to a greater extent than are the side panels. An arcuate flap or extension 35 may be provided at the top of each of the side panels 33 and 34. Said arcuate flap 35 is provided with a notch 37 along its curved edge slightly rearward of center for a purpose to be described later.

The back panel 31 has a contiguous inner shoulder member 39 which cooperates with outer shoulder sections 41 and 43 integrally connected to the front panel 29. The inner shoulder member 39 is provided with a plurality of longitudinal score lines 44 (see FIGS. 4 and 5) so that it may be readily bent over the rear portions of arcuate flaps 35. Notches 50 are provided adjacent the outer corners of shoulder member 39 which cooperate with notches 37 of said arcuate flaps 35 to retain shoulder member 39 in its rounded position.

Figures 1, 4:
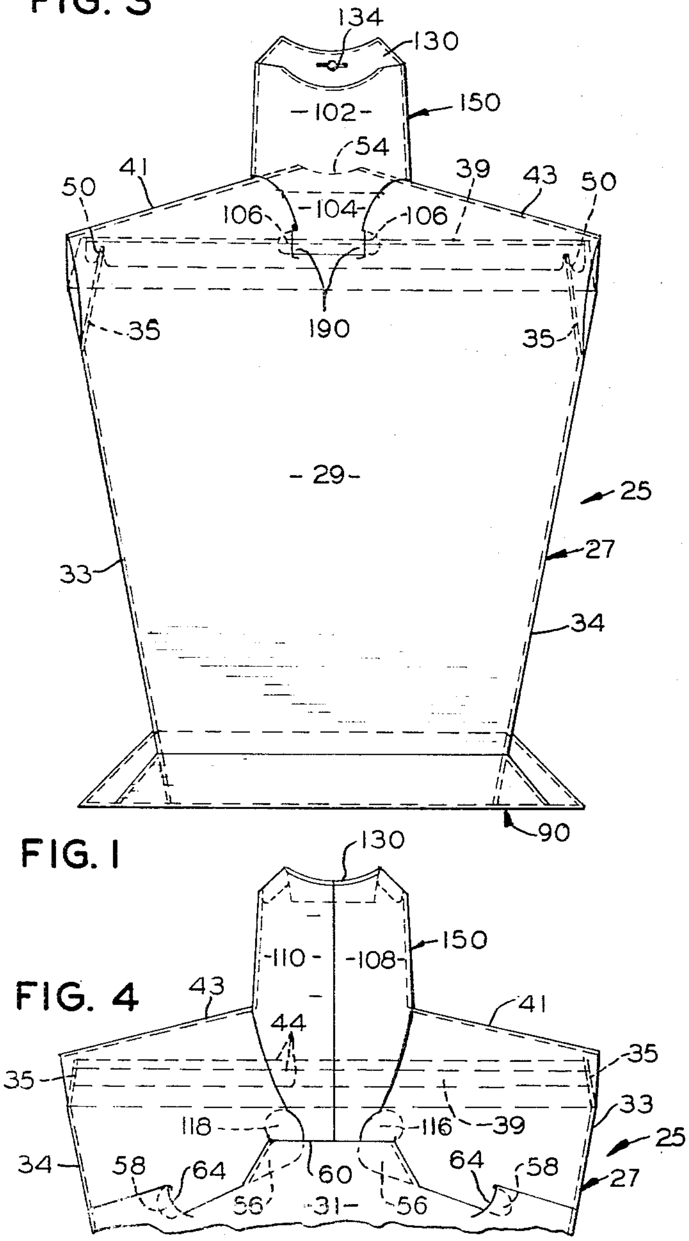
FIG. 1 is a front elevation of one embodiment of a torso form of the present invention assembled from separately formed body, neck and base members.
FIG. 4 is a fragmentary rear elevation of the upper portion of the torso form shown in FIG. 1.
Figure 2:
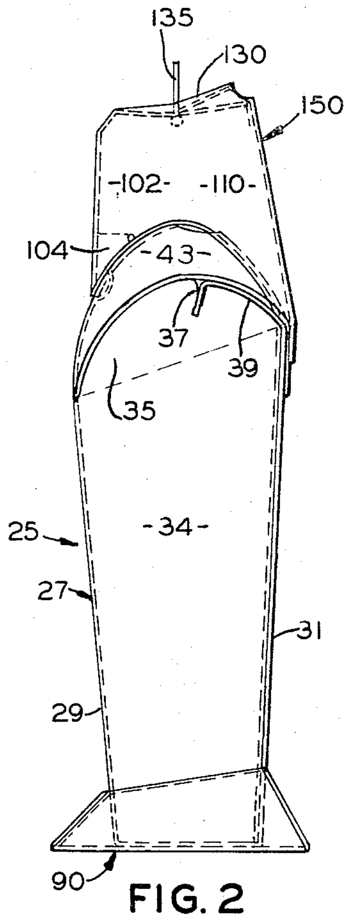
FIG. 2 is a side elevation of the torso form shown in FIG. 1.

The outer shoulder sections 41 and 43 are substantially longer than inner shoulder member 39 and they extend over and beyond said member 39 as particularly shown in FIGS. 2 and 4. Shoulder sections 41 and 43 have diverging outward edges and are severed from each other by an off-center angular cut 52 (see FIG. 5) extending from an aperture 54 to the nearest edge of shoulder section 41 to produce smaller and larger sections 41 and 43, respectively. The aperture 54 may be located centrally of shoulder sections 41 and 43 at a center point which later forms an imaginary apex of the shoulder line of the torso form. This arrangement permits the rear portions of the outer shoulder sections to be converged and overlapped resulting in a rounded and inclined shoulder line. The shoulder sections are retained in position by locking tabs 56 and 58 located at their extremities, and corresponding slits 60 or 62 and 64 in the back panel 31. Slit 60 may cooperate with lock tabs 56 in the male form and slit 62 may cooperate with the lock tabs 56 in the female form. Both slits 60 and 62 are centrally located in the upper region of back panel 31. Locking tabs 58 are for insertion in the slits 64 which may be located slightly downwardly and outwardly from slit 60.

Figures 5, 6:
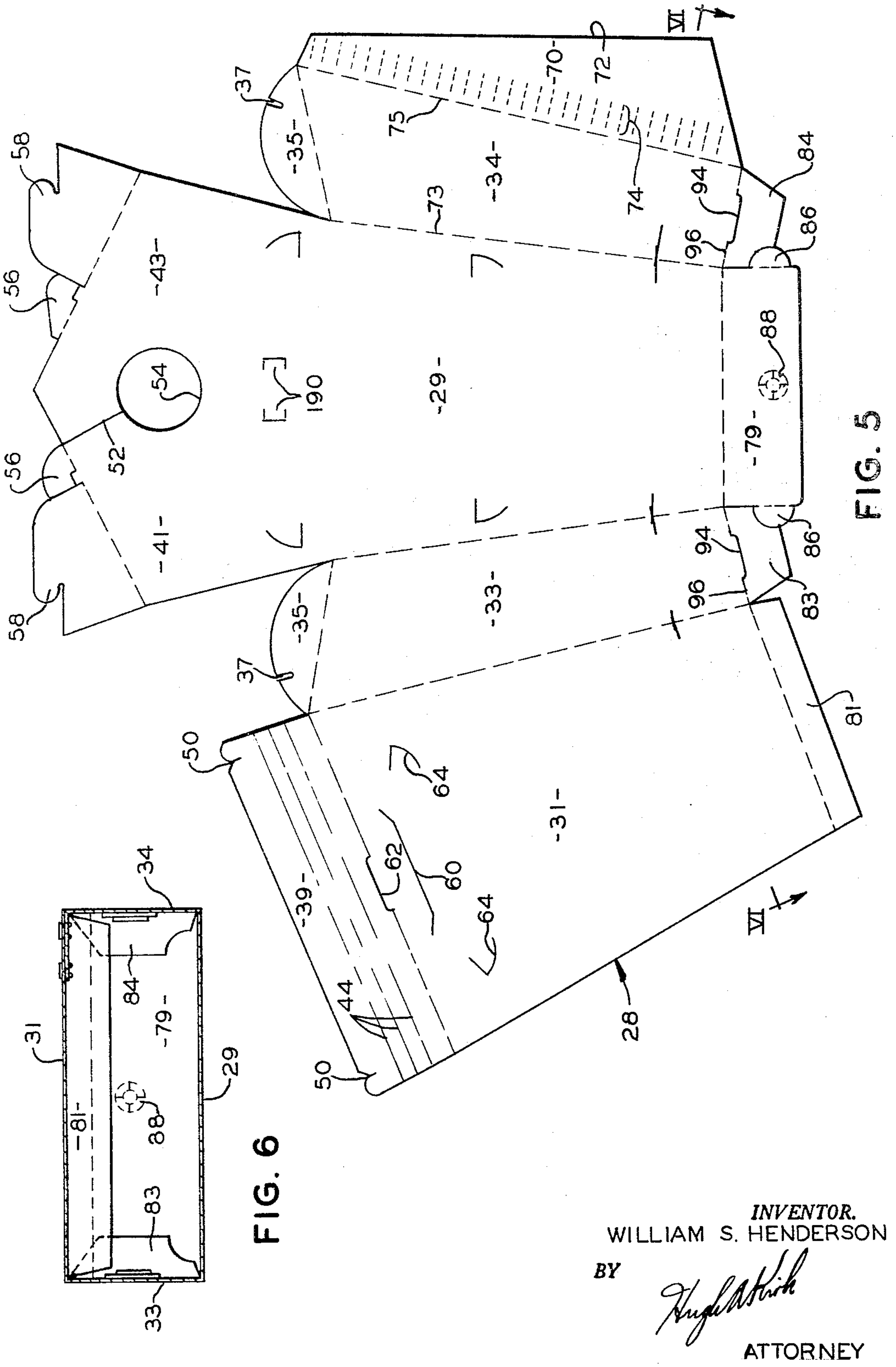
FIG. 5 is a plan view of the cut and scored blank for the body member of the torso form shown in FIG. 1 which includes additional slits in the front and back panels for adaptation also for a female form.
FIG. 6 is an internal view of the lower region of the assembled body blank taken along VI—VI of FIG. 5.
Figure 8:
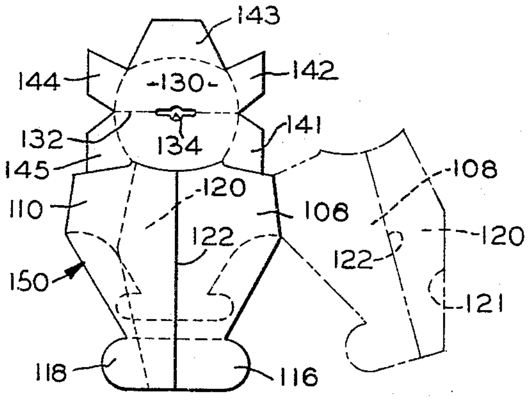
FIG. 8 is a plan view of the neck member in a flat folded or preassembled state showing the parallelism between the guiding edge of the unfolded panel in dashed lines and the fastening or glue line of the folded neck blank.
Figure 7:
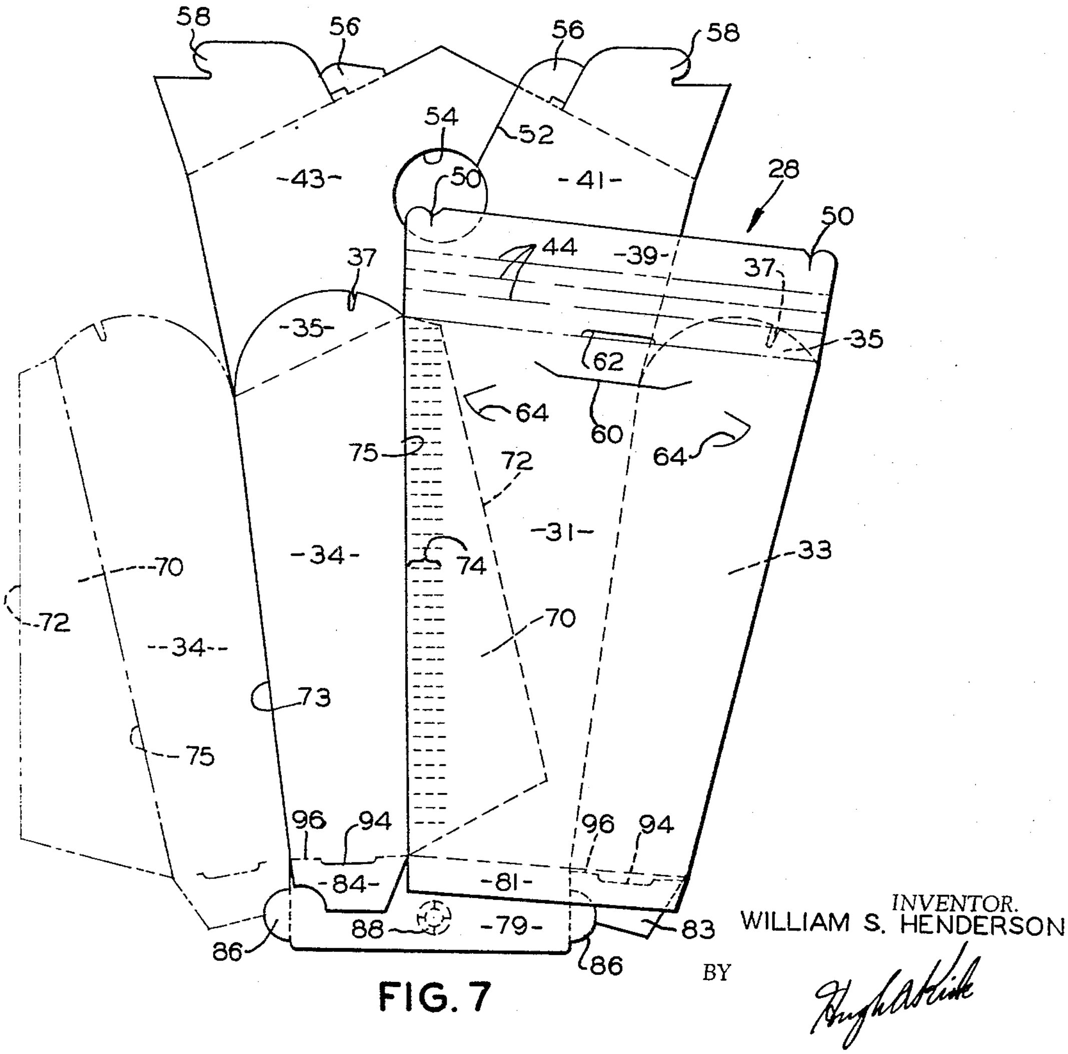
FIG. 7 is a plan view of a body blank shown in FIG. 5 in a flat folded or pre-assembled state with the parallelism shown between the guiding edge of the unfolded panel in dashed lines and the fastening or glue line of the folded body blank.

FIG. 5 may be referred to for additional details of the cut and scored fiber or paper board flank 28 from which the body portoin 27 is formed. One of the elements not shown in FIGS. 1 through 4 or previously described is the generally triangular junction and guide flap 70 adjacent one side of the front panel 29. The outer guiding edge 72 of said flap 70 parallels the planned direction of passage of the body blank through a folding and fastening machine which may first inwardly fold the junction and guide flap 70 and adjacent side panel along fold line 73 into back-to-back relationship with front panel 29, and secondly fold a back panel 31 into back-to-back relationship with its adjacent side panel 33 and front panel 29 so that the back panel overlaps the juncture flap 70 (see FIG. 7). Thus, the guiding edge 72 of the unfolded body blank parallels the fastening or glue line 74 of the flat folded body blank. The back panel 31 and the juncture flap 70 may be fastened together at an appropriate time during the machine cycle by gluing, taping, stitching or fastening means along a common line which parallels the course established by the guiding edge of said juncture and guide flap 70 thereby forming a collapsed flat partially assembled body section as particularly shown in FIG. 7. The outer surface of the guide flap 70 along its hinged edge 75 may be perforated to enhance adhesion when the blank is formed of a laminated or coated decorative sheet material with a relatively poor adhesive surface.

Figure 14:
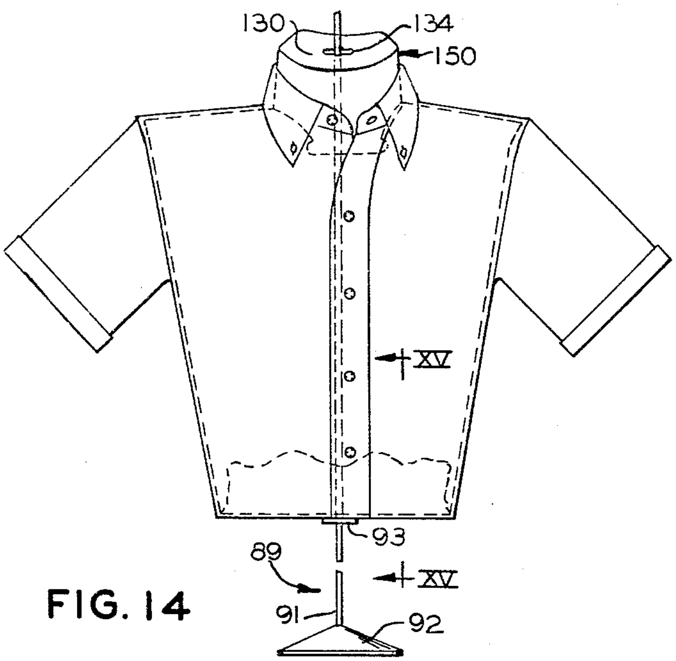
FIG. 14 is a front elevation of the torso form on a reduced scale supported on a rod type stand, and also being shown supporting a man's shirt.
Figure 15:
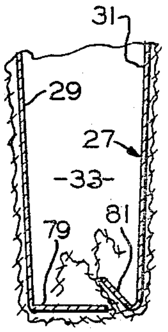
FIG. 15 is a slightly enlarged fragmentary vertical sectional view taken on line XV—XV to show the lower tail sections of the shirt tucked into the bottom of the body form.
Figure 16:
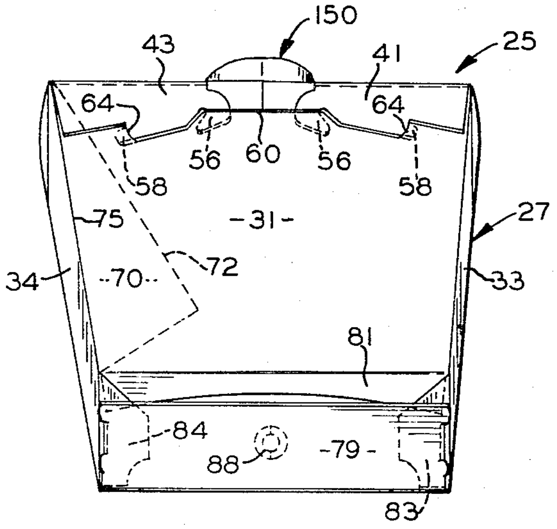
FIG. 16 is a slightly enlarged bottom perspective view of the body form of FIG. 14 illustrating the bottom flap arrangement to illustrate the tuck-in feature shown in FIG. 15 but without a shirt shown thereon.
Figures 17, 18, 19, 21:
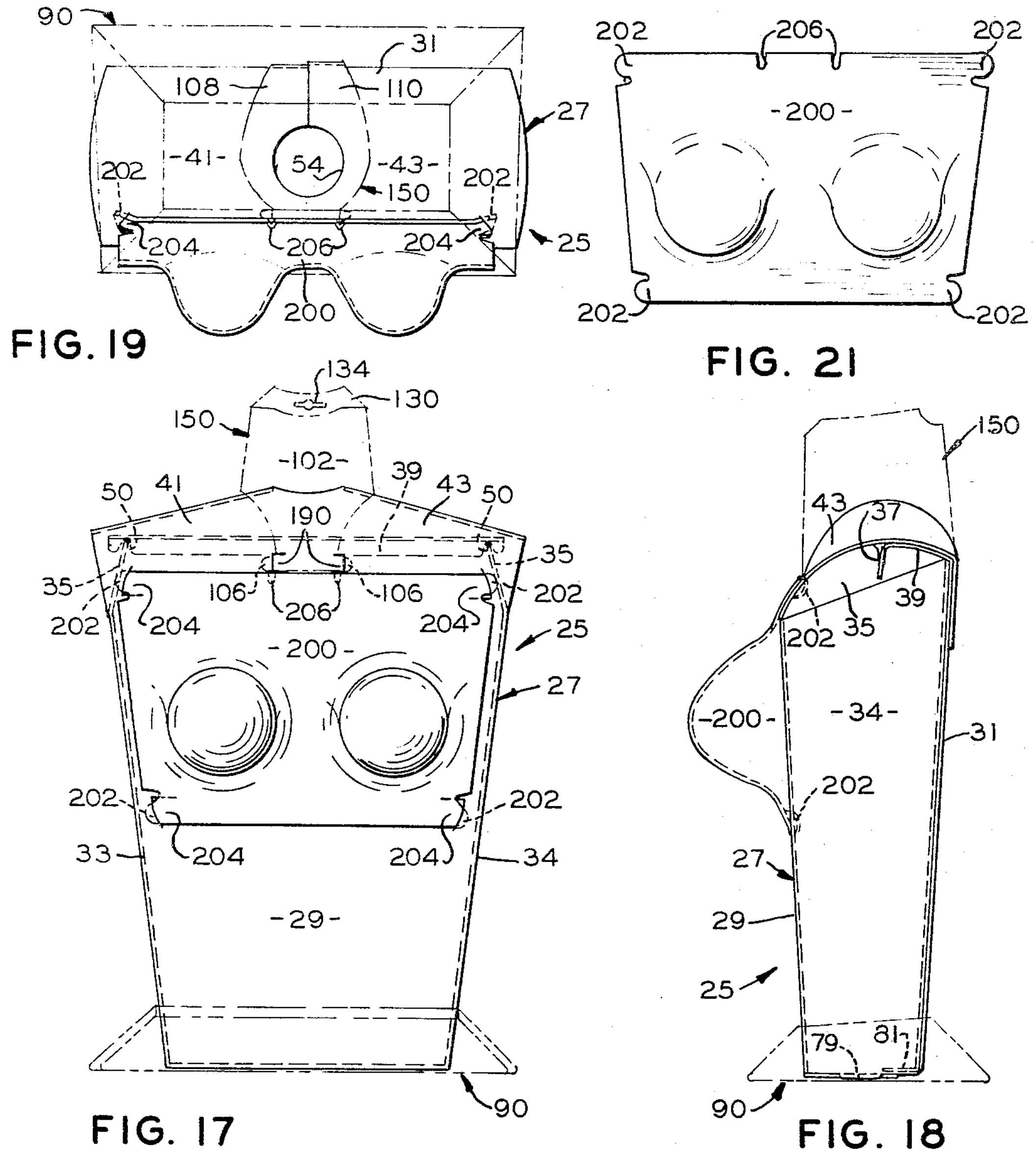
FIG. 17 is a front elevation similar to FIG. 1 but of a modified embodiment including a breast form for adapting the torso form for female garments with a neck and a base member only shown in dashed lines.
FIG. 18 is a side elevation of the torso form shown in FIG. 17.
FIG. 19 is a top plan view of the torso form shown in FIGS. 17 and 18.
FIG. 21 is a front elevation of the plastic or preformed breast form and illustrating the locking tabs for attaching the form to the body member.
Figure 20:
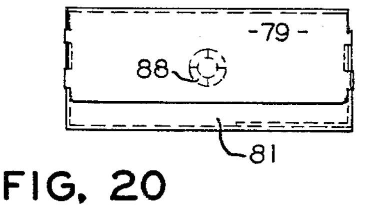
FIG. 20 is a bottom view of the body member of the device shown in FIGS. 17, 18 and 19.

The details of the bottom portion of the body 27 which form an important part of this invention, are shown in FIGS. 5, 6, 7, 15, 16 and 20. Depending bottom closure flaps 79, 81, 83 and 84 are foldably connected to the front 29 back 31 and side 33 and 34 panels, respectively. The outer and largest bottom flap 79 has side tuck tabs 86 located at both ends, and located midway between the said tuck tabs 86 is a knock-out section 88 provided for the admission of a suspending cord, rod, pipe or pole standard 89 (see FIG. 14) when the foldable base member 90 is not used. The pole standard 89 may have a pole or rod section 91 with a rigidly attached weighted base section 92 to enhance stability of the simulated torso when it is held in an elevated position by the adjustable locating bracket or ring 93 which may be slidably attached to the pole 91. Bottom flaps 83 and 84 have cooperating slits 94 along their fold lines 96 into which the locking tabs 86 of flap 79 may be inserted. When the body section 27 is completely assembled and a shirtwaist placed thereon, the inner bottom flap 81 may be pressed inwardly slightly thereby permitting the tucking of the shirt tails into the hollow interior of the torso form as particularly shown in FIG. 15 to produce a smooth, unwrinkled front for the garment on the form.

Final assembly can be achieved by pressing opposite folded edges of the partially assembled body form 27 until the bottom opening thereof is rectangular in shape. Thereafter the inner shoulder section 39 attached to the back section 31 may be arcuately bent at the score lines 44 until the notches 50 of the inner shoulder section 39 engages notches 37 of arcuate flaps 35. The outer shoulder sections 41 and 43 attached to the front panel member 29 are then bent rearwardly until the lock tabs 56 and 58 thereof are inserted in the cooperating slits 60 or 62 and 64 located in the shoulder region of the back section 31. In so doing the back portions of the shoulder sections overlap one another with a portion of the larger shoulder section 43 lying beneath the smaller section 41. A rounded inclined and natural appearance is thereby given to the shoulders. The bottom flaps are folded inwardly beginning with the back bottom flap 81 followed by both side flaps 83 and 84. The tuck tabs 86 of the front flap 79 are pre-folded and as the front flap is folded inwardly they are inserted in corresponding slits 94 whereupon the assembly of the body member 27 is completed.

Figure 9:
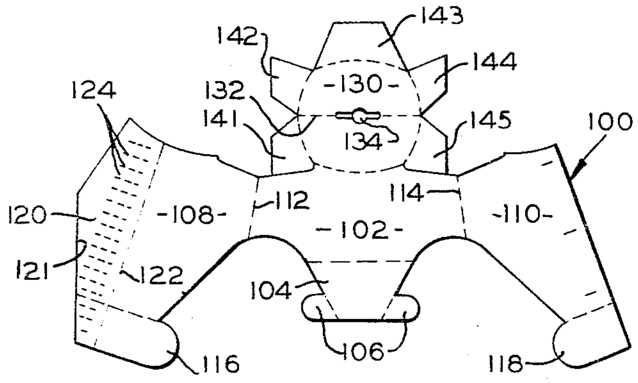
FIG. 9 is a plan view of the cut and scored blank for the neck member of the torso form shown in FIG. 1.
Figure 10:
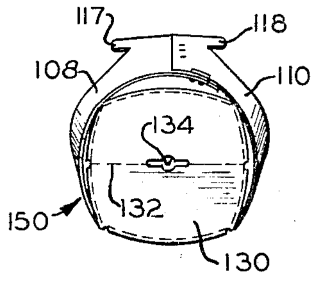
FIG. 10 is a top plan view of the formed neck member made from the blank of FIG. 9.

Referring now specifically to FIG. 9 the neck blank 100 is shown in a flat and unassembled condition having a frontal neck band 102 with a contiguous depending flap 104 and appending tabs 106. Left and right nape members 108 and 110 as shown in the blank in FIG. 9, are connected to the neck band 102 at fold lines 112 and 114, respectively, and have appending tabs 116 and 118 at their respective lower extremities. The one nape section 108 is provided with a juncture flap 120 adjacent its outer fold line 122 which has an outer machine guide edge 121 (as edge 72 in blank 28 of FIG. 5) parallel to the center line of the neck blank and may contain surface perforations 124 to enhance bonding when an adhesive substance is used to pre-assemble said neck blank 100. Hinged to the front neck band 102 opposite the flap 104 is a generally circular top portion 130 around which the upper portion of the neck is formed. Top section 130 has a central score line 132 to improve the form thereof and a slot 134 for the receipt of a suspending cord 135 (FIG. 2) which also may be knotted below bottom closure knock-out 88, or rod support member 89 (see FIG. 14). when the foldable base member 90 is not used. The circular top portion 130 also has depending flaps 141, 142, 143, 144 and 145 which engage the inner surface around the top of the assembled neck member 150. The neck blank 100 may be pre-assembled before shipment by first folding the nape 108, having the juncture flap 120, inwardly at fold line 112 then inwardly folding the opposed nape section 110 at fold line 114 completely overlapping the juncture flap 120 at which time the juncture flap and the opposed nape section 110 may be joined by gluing, taping, stitching or other fastening means. Final assembly of the neck member 150 is achieved by inwardly folding the flaps surrounding the top circular portion 130, then after forming the balance of the neck section into a cylindrical shape the top portion 130 may be folded at its connecting fold line until it is flush with the top of the neck. Normally in performing this operation the top section will be slightly depressed along its center line crease 132 as shown in FIG. 2.

Figure 11:
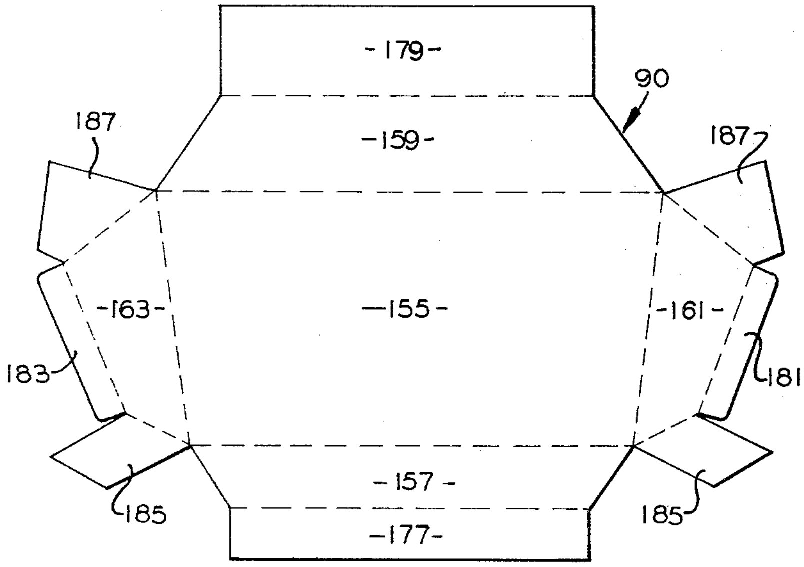
FIG. 11 is a plan view of the cut and scored blank for the base member by which the torso form of FIG. 1 may be supported.
Figure 13:
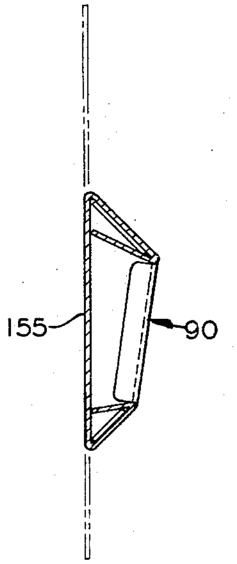
FIG. 13 is a sectional view taken along line XIII—XIII of the base member of FIG. 12.
Figure 12:
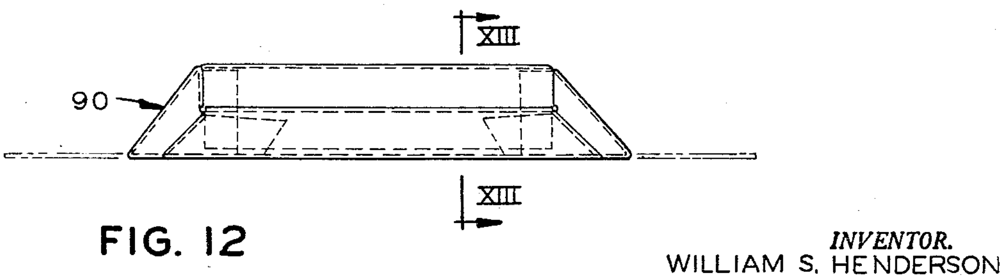
FIG. 12 is a front elevational view of the base member made from the blank of FIG. 11.

FIGS. 11, 12 and 13 show another supporting means such as a base 90 for the torso form 25 which may be foldably formed from a single blank having a bottom panel 155 with inwardly inclined front 157, back 159, and side 161, 163 members having appending secondary flaps 177, 179, 181 and 183, respectively. In addition to the secondary flaps 181 and 183 the side members 161 and 163 have front and rear engaging flaps 185 and 187 connected at the respective ends thereof. The width of engaging flaps 185 correspond to the width of the front member 157 and likewise the width of engaging flap 187 corresponds to the width of the back member 159. The width of the back member 159 is greater than the width of the front member 157 and each of their appending flaps has a width slightly greater than the height of its respective fold line from the bottom panel as measured when the base member 90 is in its assembled position. In assembling the base member 90 the secondary flaps and the front and rear engaging flaps 185 and 187 of the side members 161 and 163 are pre-folded, then the side members are folded inwardly to their appropriate inclined position at which time the front 157 and back 159 members are folded inwardly until they make contact with their respective front and back engaging flaps of the side members. Then the folding stops with regard to the primary members and continues with regard to the secondary flaps until they in turn have been folded past the point of engagement with the bottom panel 155 for self-locking.

The assembled sub-assemblies of the simulated torso form may be removably joined together by simply inserting the bottom of the body member 27 into the snugly fitting cavity of the base member 90. The neck member 150 may be joined to the body member 27 by inserting appending front neck tabs 106 into corresponding slots 190 located in the front central shoulder regions of the body member 27. The rear neck tabs 116 and 118 may then be inserted beneath the base of shoulder tabs 56 as particularly shown in FIG. 4. The pole standard 89 (see FIG. 14) may be used in place of the foldable base 90 in which case the top of the pole 91 may be inserted through the knock-out section 88 in the bottom closure of the body member 27 then upward through the slot 134 in the top portion 130 of neck member 150 until the locating bracket 93 on pole 91 engages the bottom closure of body member 27. The torso form may be used to display garments longer than shirtwaists when the pole standard 89 is used.

Referring specifically to FIGS. 17 through 21 the torso form 25 has been adapted for the display of apparel for women by the addition of a female breast form 200 preferably comprising a molded plastic form with a naturally distinctive configuration and which may be transparent or of the same color as the coating. Tuck tabs 202 may be provided at each corner of said breast form 200 whereby the form may be attached to the body section 27 by inserting tabs 202 into corresponding slits 204 located at the sides of the upper and lower chest regions. Notches 206 may be provided along the top edge of the breast form near the center which help to further secure the forms together by virtue of the interlocking of the neck section with the breast form and body section.

While there is described above the principles of this invention in connection with specific illustrations, it is to be clearly understood that this description is made only by way of example and not as a limitation to the scope of this invention.

What is claimed is:

1. A torso form, foldable from a one-piece fiberboard blank, said form comprising:

(a) a series of foldably connected flat panels folded together along downwardly converging straight lines, including front, back and side panels and a juncture guide flap, (b) convergeable shoulder panels integrally connected to said front panel, (c) a shoulder member integrally connected to said back panel, (d) closure flaps connected to the bottom edges of said front, back and side panels, and (e) interlocking tabs and slits between said shoulder panels and said back panel and between said closure flap connected to said front panel and said side panels.

2. A blank according to claim 1 wherein the said juncture flap has a mechanical guide edge which bears an angular relationship to the connecting edges of said panels when said panels are unfolded and a parallel relationship to the edge of the panel to which it is to be connected when said panels are folded.

References Cited

UNITED STATES PATENTS

| | | | |
|---|---|---|---|
| 1,086,094 | 3/1914 | Smith | 223—68 |
| 2,479,140 | 8/1949 | Shafarman | 223—68 |
| 2,702,148 | 2/1955 | Paasche | 223—68 |
| 2,756,911 | 7/1956 | Kantor et al. | 223—68 |

| | | | |
|---|---|---|---|
| 2,901,154 | 8/1959 | Baldwin | 223—68 |
| 2,922,555 | 1/1960 | Cella | 223—68 |
| 3,084,837 | 4/1963 | Wolf | 223—68 |

FOREIGN PATENTS

| | | |
|---|---|---|
| 614,089 | 12/1948 | Great Britain. |
| 852,191 | 10/1960 | Great Britain. |

PATRICK D. LAWSON, *Primary Examiner.*

JORDAN FRANKLIN, *Examiner.*

G. V. LARKIN, *Assistant Examiner.*